United States Patent
Avidan et al.

(10) Patent No.: US 10,382,454 B2
(45) Date of Patent: Aug. 13, 2019

(54) DATA MINING ALGORITHMS ADOPTED FOR TRUSTED EXECUTION ENVIRONMENT

(71) Applicant: McAfee Inc., Santa Clara, CA (US)

(72) Inventors: Yaniv Avidan, Moshav Mahseya (IL); Alex Nayshtut, Gan Yavne (IL); Igor Muttik, Berkhamsted (GB); Omer Ben-Shalom, Rishon Le-Tzion (IL)

(73) Assignee: McAfee, LLC, Santa Clara, CA (US)

( * ) Notice: Subject to any disclaimer, the term of this patent is extended or adjusted under 35 U.S.C. 154(b) by 214 days.

(21) Appl. No.: 14/498,266

(22) Filed: Sep. 26, 2014

(65) Prior Publication Data
US 2017/0054738 A1 Feb. 23, 2017

(51) Int. Cl.
*H04L 29/06* (2006.01)
*G06F 21/56* (2013.01)
*G06F 16/951* (2019.01)
*G06F 21/55* (2013.01)
*H04W 12/12* (2009.01)
(Continued)

(52) U.S. Cl.
CPC ........ *H04L 63/1416* (2013.01); *G06F 16/951* (2019.01); *G06F 21/552* (2013.01); *G06F 21/566* (2013.01); *G06N 5/022* (2013.01); *G06N 7/005* (2013.01); *H04W 12/12* (2013.01); *H04L 63/14* (2013.01)

(58) Field of Classification Search
CPC ....................... H04L 63/1416; G06F 17/30864
USPC .......................................................... 726/23
See application file for complete search history.

(56) References Cited

U.S. PATENT DOCUMENTS 8,677,497 B2   3/2014  Basavapatna et al.
8,813,236 B1 *  8/2014  Saha ................... H04L 63/1408
                                                    726/22
(Continued)

FOREIGN PATENT DOCUMENTS

CN      102647409 A     8/2012
EP         2723034       4/2014
(Continued)

OTHER PUBLICATIONS

International Search Report and Written Opinion received in corresponding PCT patent application No. PCT/US2015/051949 dated Jan. 12, 2016.

(Continued)

*Primary Examiner* — Jason K Gee
*Assistant Examiner* — Abdullah Almamun
(74) *Attorney, Agent, or Firm* — Hanley, Flight & Zimmerman, LLC

(57) ABSTRACT

Distributed systems for protecting networked computer assets from compromise are disclosed. The distributed system includes one or more enterprise event sources, such as endpoint(s). The system also includes a server, such as a Big Data Analytics server, and optionally a security management server such as a Security Information and Event Management server. The Big Data Analytics server processes data collected from the enterprise event sources and produces behavioral profile models for each endpoint (or group of similar endpoints). The profiles, models, and ontology analysis are provided to the endpoints. Endpoint analytics use the output from the analytics servers to detect deviations from the endpoint's behavioral profile.

20 Claims, 7 Drawing Sheets

(51) Int. Cl.
*G06N 5/02* (2006.01)
*G06N 7/00* (2006.01)

(56) References Cited

U.S. PATENT DOCUMENTS

| | | | | |
|---|---|---|---|---|
| 2005/0278703 | A1* | 12/2005 | Lo | G06F 11/0709 717/126 |
| 2007/0192859 | A1* | 8/2007 | Shahar | G06F 21/552 726/22 |
| 2008/0171573 | A1* | 7/2008 | Eom | H04M 1/72572 455/556.2 |
| 2009/0210475 | A1* | 8/2009 | Gadanho | G06Q 30/02 709/201 |
| 2010/0077078 | A1* | 3/2010 | Suit | G06F 21/566 709/224 |
| 2010/0281540 | A1 | 11/2010 | Alme | |
| 2011/0264608 | A1 | 10/2011 | Gonsalves et al. | |
| 2012/0255016 | A1 | 10/2012 | Sallam | |
| 2013/0074186 | A1 | 3/2013 | Muttik | |
| 2013/0081099 | A1* | 3/2013 | Sathish | G06F 21/6245 726/1 |
| 2013/0298242 | A1 | 11/2013 | Kumar et al. | |
| 2013/0326625 | A1 | 12/2013 | Anderson et al. | |
| 2014/0165207 | A1 | 6/2014 | Engel et al. | |
| 2014/0180816 | A1* | 6/2014 | Mith | G06Q 30/0251 705/14.55 |
| 2014/0205099 | A1 | 7/2014 | Christodorescu et al. | |
| 2015/0033337 | A1* | 1/2015 | Baikalov | H04L 63/1408 726/23 |
| 2015/0142828 | A1* | 5/2015 | Nguyen | G06F 17/30734 707/749 |
| 2015/0163121 | A1* | 6/2015 | Mahaffey | G06F 11/0766 707/687 |

FOREIGN PATENT DOCUMENTS

| | | |
|---|---|---|
| WO | 2011149773 A2 | 12/2011 |
| WO | 2013019879 A2 | 2/2013 |

OTHER PUBLICATIONS

McAfee, CIO Custom Solutions Group "Siem: Keeping Pace with Big Security Data", pp. 1-8, www.mcafee.com/SIEM, Sep. 23, 2013.

European Patent Office "Extended Search Report" issued in connection with EP Patent Application No. 15843737.6, May 15, 2018, 10 pages.

Schmidt et al. IEEE Communications Society "Static Analysis of Executables for Collaborative Malware Detection on Android", 2009, 6 pages.

Patent Office of the Russian Federation "Official Action" issued in connection with Russian Patent Application No. 2017105879, dated Apr. 6, 2018, 15 pages.

China National Intellectual Property Administration "First Office Action," issued in connection with Chinese Patent Application No. 201580045692.4, dated Feb. 3, 2019 (31 pages).

\* cited by examiner

DATA MINING ALGORITHMS ADOPTED FOR TRUSTED EXECUTION ENVIRONMENT

TECHNICAL FIELD

This disclosure relates to the field of computer security and, more particularly, to methods and systems of using data mining algorithms adopted for endpoint trusted execution environment to detect threats and malicious activities.

BACKGROUND ART

The Internet has enabled interconnection of different computer networks all over the world. The ability to effectively protect and maintain stable computers and systems, however, presents a significant obstacle for component manufacturers, system designers, and network operators. This obstacle is made even more complicated due to the continually-evolving array of tactics exploited by malicious software authors. Malicious software authors create malicious software ("malware") to disrupt or stop computer operations, steal information, gain unauthorized access to system resources, and conduct other unauthorized abusive, hostile, intrusive, or annoying activities. Malware continues to evolve with new malware objects being developed potentially exposing computers and systems every day.

Malware detection and prevention software, among other computer security products, have been developed to detect, block, disable, quarantine, and delete malware from systems using the computer security products. Attackers are getting more sophisticated in obfuscating malicious code and often run their own tests to simulate the targeted network and computers. Attackers often base such tests on internal information harvested before an attack (a.k.a. a reconnaissance attack phase). As a result, malware is becoming more customized, making signature-based detection progressively less effective. Consequently, there is a need in the art for effective methods for detecting threats to network systems, particularly threats that are customized for specific networks.

DESCRIPTION

Figure 1:
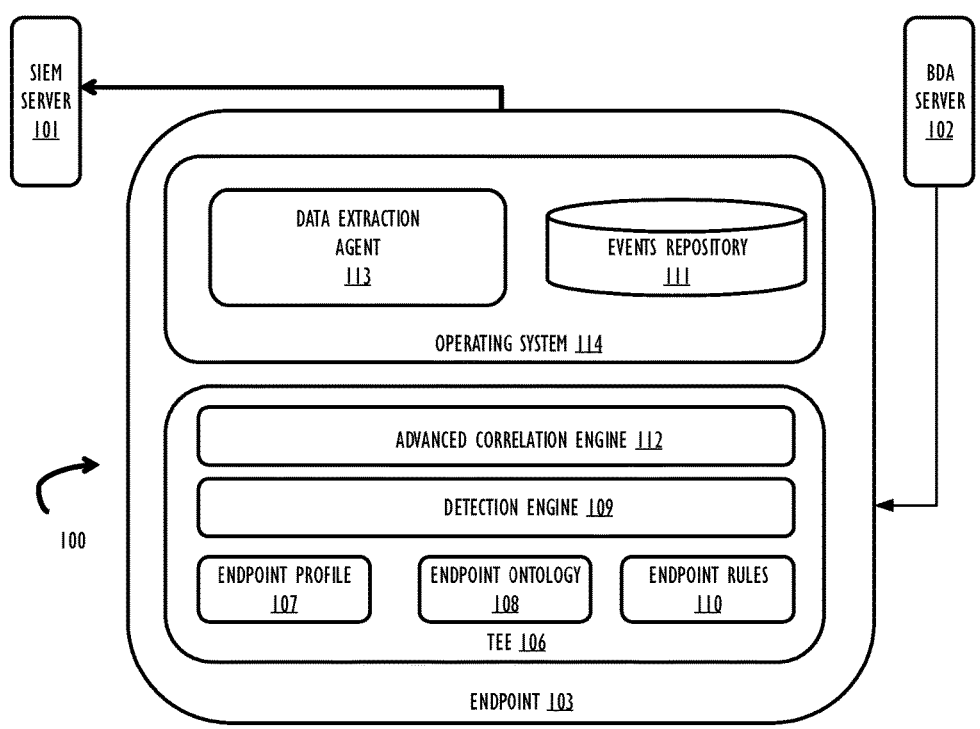
FIG. 1 illustrates an embodiment of a distributed architecture for threat detection according to embodiments described herein.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

As used herein, the terms "malware" "malcode" refer to any software used to disrupt operation of a programmable device, gather sensitive information, or gain access to private systems or networks. Malware includes computer viruses (including worms, Trojan horses, etc.), ransomware, spyware, adware, scareware, and any other type of malicious program.

As used herein, the term "ontology" refers to a structural framework for organizing information regarding an endpoint computer system. Any desired technique for implementing an ontology may be used.

As mentioned above, attackers are getting more sophisticated in their attacks on network systems by gathering data about the targeted network (reconnaissance), running their own tests to simulate the target, and developing malware that is customized to the target. Such customized attacks are difficult to detect based on traditional signature-based identification. Moreover, such attacks may evolve slowly, with long delay times between the initial compromise, reconnaissance, and exfiltration. As such, evidence of the malicious activity evolves over time instead of manifesting immediately upon initiation of the attack.

More complex defensive measures based on rules and heuristics have been developed in an attempt to thwart such customized attacks. Such defensive measures operate over events generated by enterprise data sources, IT infrastructure, and endpoint devices and are processed using Big Data servers. An example of such a defensive system is McAfee's Security Information and Event Management (SIEM) system. SIEM technology gathers, analyzes, and presents information from network security devices, identity and access management applications, vulnerability management and policy compliance tools, operating system, database, and application logs, and external threat data. An aspect of a SIEM solution is that all of the data collected by a variety of security assets is compared in a single location.

A drawback to the SIEM approach is that gathering logs, extracting, and batch processing large volumes of data is prone to significant delays. Thus, there may be a significant lag in the detection of an attack. In addition, the SIEM analytics lack visibility into the endpoints and thus lack contextual information concerning the events that cause an alert. This lack of visibility and context can result in a relatively high level of false positive alerts, which must be manually analyzed.

One solution is to execute behavioral detection machine learning algorithms in the endpoints to improve the reaction time and to provide richer local context, thereby reducing false positive events. Unfortunately, analyzing events in the endpoints can negatively impact the performance and battery life of the endpoint devices. Also, because endpoints are generally less protected than higher value corporate IT components such as servers, endpoints are compromised more often. As a result, malware may be able to tamper with execution of local endpoint analytics and forge the results. Moreover, closed operating systems (such as iOS, Android, Windows RT, etc.) running endpoints increasingly restrict event gathering capabilities in endpoints, limiting the scope of possible in-endpoint behavioral analytics.

The methods and systems described herein address the drawbacks associated with both the server-based and endpoint-based solutions described above by distributing the operations related to events gathering and analysis between a dedicated analytics server (for heavy calculations) and the endpoints (with a "thin" client). Heavy duty Big Data Analytics (BDA) servers process data collected from the enterprise event sources and endpoints and produce behavioral profile models for each endpoint (or group of similar endpoints), in addition to server-based anomaly detection. These profiles may include set-up parameters, configurations, behaviors, etc. The analytics servers also generate an enterprise-level endpoint ontology, which may represent the form of identities, relationship graphs, activities, etc. In some embodiments, the analytics servers may generate ontologies for departments of an enterprise, geographic locations, etc., in addition to or instead of enterprise-wide ontologies. The profiles, models, and ontology analysis are provided to the endpoints. Accordingly, each endpoint has contextual information concerning other enterprise-level ontology. Endpoint analytics use the output from the analytics servers to detect deviations from the endpoint's behavioral profile. According to some embodiments, the endpoints execute local analytics inside a trusted execution environment (TEE) to avoid malware interference. Also, the endpoints may extract and submit both dynamically obtained events and statically-extracted features to the analytics server. An example of a dynamically obtained event is a call to the OS's URLDownloadToFile( ) API. An example of a statically-extracted feature is an indication that a call to the OS's URLDownloadToFile( ) API was found in a decompiled application. Such feedback to the analytics server enriches the context and also helps mitigate the limitations imposed by closed OSs. These events and features are used to build models, so may be provided as an ongoing feed from the endpoints 103 to the BDA servers 102.

FIG. 1 illustrates an embodiment of a distributed security system 100 as described herein. System 100 includes a SIEM server 101 and a BDA server 102. While servers 101 and 102 are illustrated as separate devices in FIG. 1, the same equipment could share both SIEM and BDA functionalities, or either or both of those functions could be distributed between multiple devices. One example endpoint 103 is also illustrated in FIG. 1. A BDA server 102 or a SIEM server 101 typically supports multiple endpoints 103.

BDA server 102 creates and maintains endpoint profiles and enterprise ontology models and pushes those models to the endpoints 103. Endpoint profiles and enterprise ontology models may be pushed to endpoint 103 on a regular basis, for example daily. According to certain embodiments, the models are periodically pushed to a TEE 106 within endpoint 103. The BDA server 102 also has detection functionality over large volumes of data.

Endpoint 103 stores its personal (or group) endpoint profile 107 and enterprise ontology model 108 within TEE local storage. Endpoint 103 extracts events raised by detection engine 109 using endpoint rules 110 and the endpoint profile 107. Those events are extracted into events repository 111. Events repository 111 is contained within endpoint 103, preferably in protected storage of the TEE 106, however operating system accessible storage may also be used, as illustrated in FIG. 1. Endpoint 103 detects suspicious behavioral patterns by running advanced correlation engine 112 over the events repository 111 and the locally stored ontology models 108. Events generated by advanced correlation engine 112 are sent to the SIEM server 101 and BDA server 102 for further machine learning and further correlation analysis. Data extraction agent 113 facilitates the extraction of events. Data extraction agent 113 and events repository 111 can be components of the endpoint operating system 114.

An attack against a target's network infrastructure may be initiated by gaining access to an endpoint on that infrastructure, for example, using a spear fishing or waterhole attack. As used in the art, the term "spear fishing" refers to an attack in the form of a personalized email seeking information. The term "waterhole" refers to an attack wherein the attackers modify a website frequented by the client such that, when the client visits the website the client becomes compromised. Either of these attacks results in the downloading and installing of a file at the endpoint 103. Once the attacker gains access to an endpoint 103, the attacker uses that endpoint 103 to conduct reconnaissance about the network system and assets and to launch an expanded attack on the system.

As mentioned above, BDA server 102 generates endpoint profiles and enterprise ontologies. The endpoint profiles and enterprise ontology can include graphical representations of event sequences and processes of a compromised endpoint 103. Such graphical representations are a part of an enterprise level ontology of an attack, based on security events referred to herein as Indicators of Compromise (IOC). Security events are generated by the endpoint operating system 114 and by real-time deviation from the endpoint profile 107 and endpoint rules 110. Those security events are stored in the endpoint event repository 111.

Table 1 outlines an example event sequence as might be calculated by BDA server 102, representing the ontology of a compromised endpoint 103.

TABLE 1

Event sequence of a compromised endpoint.

| Sequence | Activity Description | Event |
|---|---|---|
| S1 | Attacker starts on one given client with initial compromise via spear phishing or waterhole attack. | E1.0-Downloading file and installation on endpoint (OS event). E1.1-Download behavior change identified against endpoint profile. |

TABLE 1-continued

Event sequence of a compromised endpoint.

| Sequence | Activity Description | Event |
|---|---|---|
| S2 | Attacker fetches a local IT Help administrator account password from a local password file, for example from the security accounts manager (SAM) database, and begins to login to devices as the user through trusted login systems. | E2.0-Anomalous number of failed logins. E2.1-Anomalous login trials to new lateral systems. E2.2.-Malcode starts a new service. E2.3-Malcode modifies registry. |
| S3 | Attacker attempts to obtain further system details, for example, using a "net group" command. | E3.0-"net group" command. |
| S4 | Attacker uses a trust relationship to remote-connect to another system in the environment with a discovered account and password. | E4.0-Remote connection event. |
| S5 | Attacker creates and/or updates a local account or service account to confuse identity detection. | E5.0-Local account creation. E5.1-Local account privileges change. |
| S6 | The installed malcode calls to the command and control (C2) server (i.e., the attacker's infrastructure). | E6.0-Beacon activity to an unusual domain following install. E6.1-Malcode beaconing activity sends message to C2. E6.2-Malcode calls out to known blacklist IOC identified by endpoint rules. |

Figure 2:
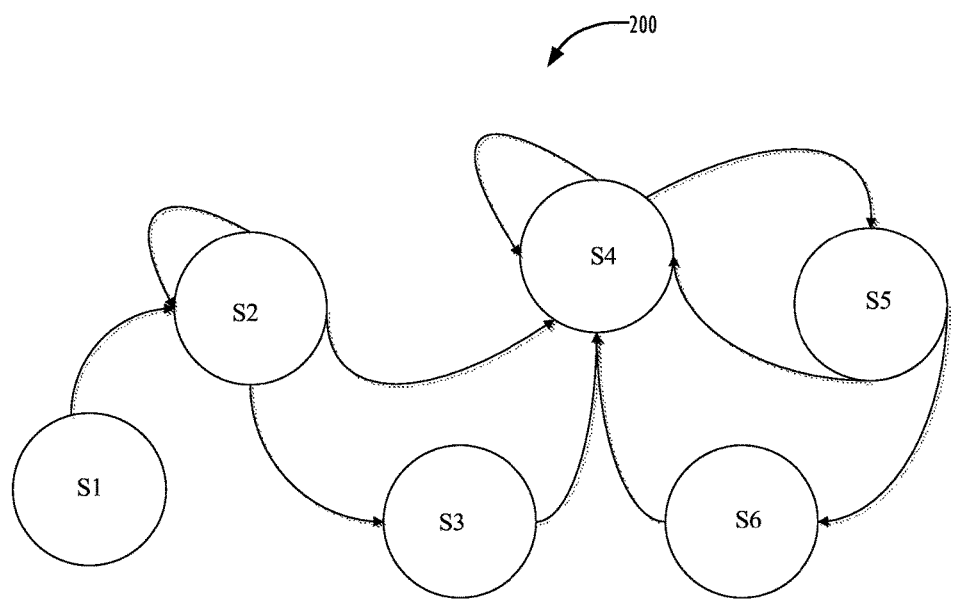
FIG. 2 illustrates an endpoint ontology calculated for a compromised endpoint.

FIG. 2 illustrates an endpoint ontology 200 calculated by a BDA server 102 based on the sequence outlined in Table 1. Ontology 200 is a graphical representation of the event sequences calculated based on the attack outlined in Table 1. In this example, event E1 occurs in sequence S1, which is followed by event E2 occurring in sequence S2. Multiple sequences S2 may occur, as indicated by the arrow looping back to sequence S2. Following sequence S2, events E3 or E4 may occur, causing sequence S3 or S4. Sequence S4 may be followed by other instances of sequence S4, or by sequence S5 (event E5). Sequence S5 may be followed by sequences S4 and S6. The calculated ontology 200 is periodically pushed to the endpoint 103 so that the advanced correlation engine 112 can use it as a reference.

The advanced correlation engine 112 monitors processes and ontology of the endpoint 103 to detect their correlation to the ontology 108 of a compromised endpoint calculated by BDA server 102. According to certain embodiments, the algorithm is based on an assumption that the sequence of endpoint states associated with an attack are a Markov chain, meaning that the probability that the endpoint will occupy a given state in the sequence depends only on the immediately preceding state. Stated differently, the future state of the endpoint is probabilistically determined based on the present state of the endpoint, but is not based on how the endpoint 103 achieved its present state.

Moreover, the actual processes and ontology (i.e., the aggregate tasks performed by the processes) of an endpoint 103 are not directly observable. Only the output events and process behaviors, such as emitted system calls are observable. Thus, the advanced correlation engine 112 determines and models the endpoint ontology based on those observable events (termed herein "actual events"). This condition is referred to as a hidden Markov model (HMM). The advanced correlation engine 112 applies a categorical sequence-labeling algorithm based on the endpoint ontology to identify a targeted attack pattern in the actual event sequences. The sequence-labeling algorithm is probabilistic, relying on statistical inference to find the best-fit sequence that describes the targeted attack. Each state has a probability distribution over possible output sequences.

Using the HMM, the advanced correlation engine 112 generates a sequence of events that provide information of a possible endpoint states, i.e., a sequence of events that best fits a predefined compromised endpoint ontology. Once a best-fit state according to a defined threshold is identified, a security alert is generated, along with actual suspicious state description. HMM statistical treatment is known in the art.

The advanced correlation engine 112 applies a sequence-labeling algorithm, as described above, to the attack based on the calculated endpoint ontology. Table 2 outlines an actual event sequence corresponding to a targeted attack.

TABLE 2

Actual event sequence corresponding to a targeted attack.

| Sequence | Activity Description | Actual Event |
|---|---|---|
| AS1 | Attacker fetches a local IT Help administrator account password from a local password file, for example from the security accounts manager (SAM) database, and begins to login to devices as the user through trusted login systems. | AE2.0-Anomalous number of failed logins. |
| AS2 | Attacker uses a trust relationship to remote-connect to another system in the environment with a discovered account and password. | AE4.0-Remote connection event. |

TABLE 2-continued

Actual event sequence corresponding to a targeted attack.

| Sequence | Activity Description | Actual Event |
|---|---|---|
| AS3 | Attacker creates and/or updates a local account or service account to confuse identity detection. | AE5.1-Local account privileges change. |
| AS4 | The installed malcode calls to the command and control (C2) server (i.e., the attacker's infrastructure). | AE6.2-Malcode calls out to known blacklist IOC identified by endpoint rules. |

Figure 3:
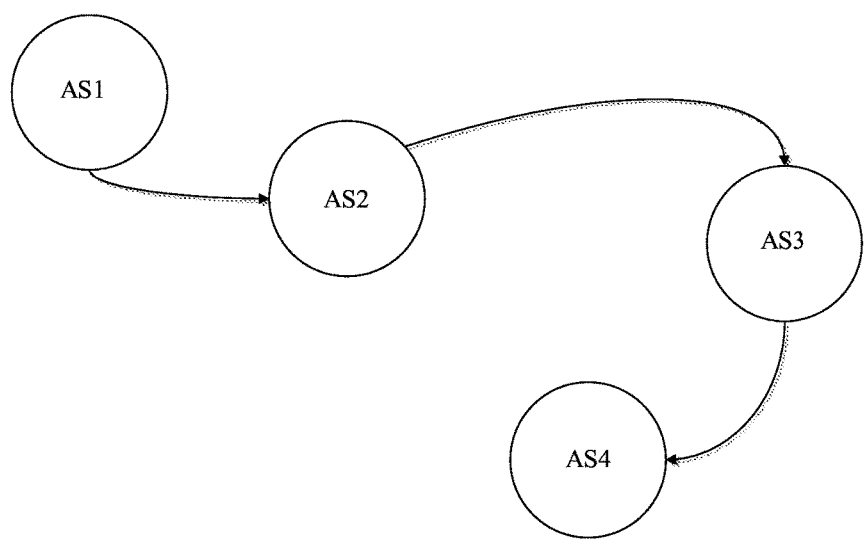
FIG. 3 illustrates a calculated sequence of events that best fits a predefined compromised endpoint ontology.

FIG. 3 illustrates a sequence of events calculated by the advanced correlation engine 112 that best fits the predefined compromised endpoint ontology. Once a "best fit" state is identified, according to a defined threshold, a security alert is generated along with an actual suspicious state description. The alert and description are provided to the system administrator.

It should be noted that the advanced correlation engine 112 may use methodologies other than, or in addition to HMM to correlate actual events with a calculated ontology of a compromised endpoint 103. For example, other machine learning algorithms, such as expectation maximization, may be suitable.

Figure 4:
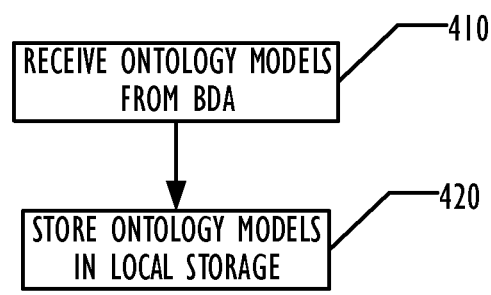
FIG. 4 is a flowchart illustrating a technique for receiving ontology models from a server according to one embodiment.

FIG. 4 is a flowchart illustrating a technique for receiving ontology models from a BDA server 102 according to one embodiment. In block 410, the endpoint 103 receives an ontology model from the BDA server 102. In some embodiments, each ontology model is sent separately from the BDA server 102; other embodiments may package multiple ontology models into a single shipment. In block 420, the endpoint 103 stores the ontology model(s) in local storage, such as the local storage area used for local ontology models 108 of FIG. 1. The ontology models may be received over a network interface from the BDA server 102, and may be transmitted and received using any desired protocol. In some embodiments, endpoint profiles and endpoint rules may be included with endpoint ontologies. In other embodiments, endpoint profiles and endpoint rules may be sent from the BDA server 102 and received by the endpoint 103 separate from ontologies.

Figure 5:
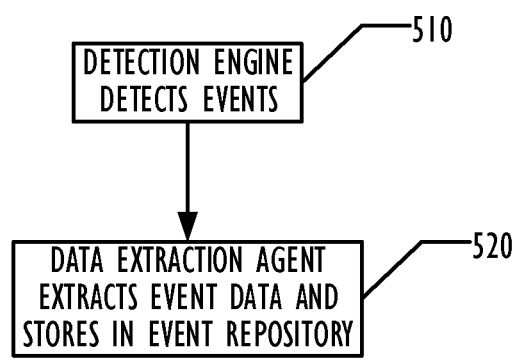
FIG. 5 is a flowchart illustrating a technique for detecting events for analysis by a correlation engine according to one embodiment.

FIG. 5 is a flowchart illustrating a technique for detecting events for analysis by the advanced correlation engine 112. As illustrated in FIG. 1, the detection engine 109 is implemented in the trusted execution environment, to avoid possible infection by malware on the endpoint 103. In block 510, the detection engine 109 detects events. As explained above, these events may include any type of event that may have a security impact, such as downloads, logins and login attempts, commands, remote connections, account creation and manipulation, and beaconing activity. These event types are illustrative and by way of example only, and other types of security events may be provided. The detection engine 109 detects the events and then in block 520, the data extraction agent 113 may be employed to extract data relevant to the specific event and store the event data, such as in the events repository 111.

Figure 6:
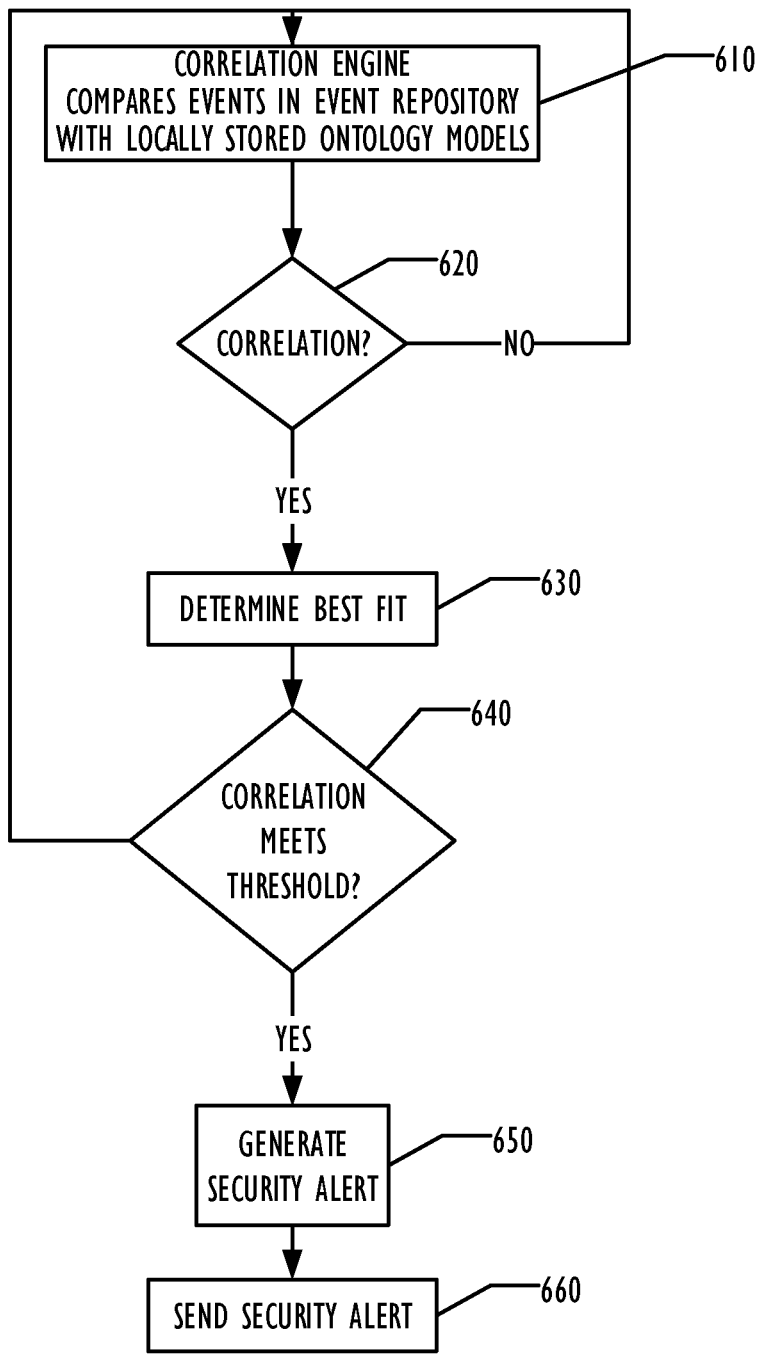
FIG. 6 is a flowchart illustrating a technique for generating security alerts according to one embodiment.

FIG. 6 is a flowchart illustrating a technique for generating security alerts according to one embodiment. In block 610 the advanced correlation engine 112 compares events in the event repository 111 with locally stored ontology models 108. As stated above, the advanced correlation engine 112 may determine and model an actual endpoint ontology using an HMM technique or any other desired technique. In one embodiment, a categorical sequence-labeling algorithm is used to determine a correlation between the event-determined ontology model and the stored ontology model(s) 108, identifying a targeted attack pattern in the actual event sequences. By generating a sequence of events, such as the events illustrated in Table 2, a correlation fit can be determined between the event-determined ontology model and the stored ontology model(s). If the event sequence does not correlate (block 620) to any stored ontology model 108, then the technique may try another sequence of events, returning to block 610. If multiple event sequences fit one or more ontology models, a best fit is determined in block 630. If the event-determined ontology model is a best fit with a stored ontology model 108 meets a predetermined correlation threshold, as determined in block 640, then in block 650 the advanced correlation engine 112 may generate a security alert or cause some other module to do so. Finally, in block 660 the security alert may be sent to a logging system, security administrator, system administrator, etc. as desired.

Figure 7:
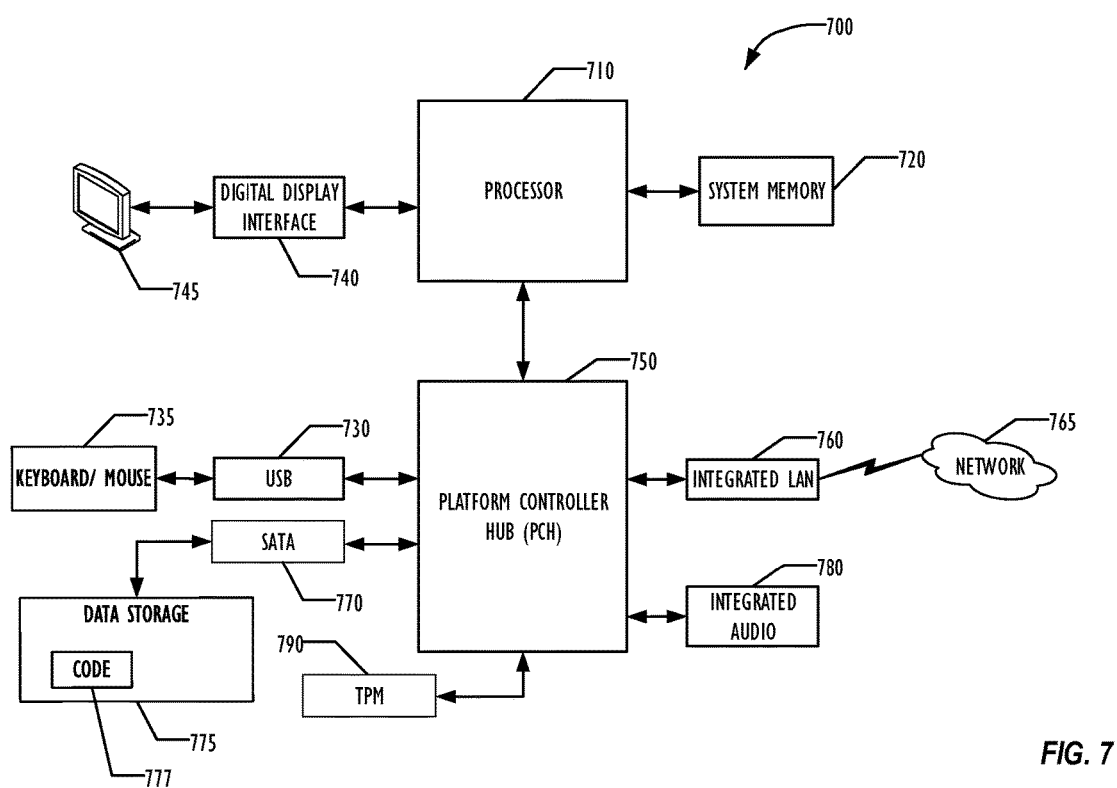
FIG. 7 is a block diagram illustrating relevant features of programmable device that can implement an endpoint according to one embodiment.

FIG. 7 is a block diagram of relevant features of programmable device 700 that can implement an endpoint 103 according to one embodiment. The person of skill in the art will recognize that certain common components and features of programmable devices have been omitted for clarity, and that other components and features may be included. In this example embodiment, a processor 710, which may be a single-core or multi-core processor of any desired type, may provide processing capabilities for some of the techniques described above. A system memory 720 is coupled to the processor 710 using any desired type of interconnect, including one or more busses or point-to-point links, a digital display interface 740 may provide an interface for connecting a display screen 745 for displaying a security alerts or any other desired information, as well as for providing a user interface for configuring and administering the programmable device 700. The programmable device may be any type of programmable device, including mobile devices such as smart phones and tablets, laptops, desktop computers, workstations, etc. Although described above as a client system relative to the SIEM server 101 and BDA server 102, the endpoint 103 may function as a server system relative to other computer systems and programmable devices, not shown. Although only a single processor 710 is illustrated in FIG. 7, any number of processors 710 may be used. Similarly, any other feature of FIG. 7 may be implemented as multiple instances of the feature, and features illustrated as separate units may be combined in any desired or convenient way. Some or all of the features of FIG. 7 may be implemented as a single chip or chipset, for example.

In the illustrated embodiment, a platform controller hub (PCH) 750 is interconnected with the processor 710, using any type of interconnect. The PCH 750 provides the capability for other devices to be used by software running on the processor 710, and may be connected to interface units to interface with other devices, such as USB interface 730 for communicating with devices such as keyboard or mouse 735, SATA interface 770 for controlling storage units such as data storage unit 775, integrated LAN interface 760 for communicating with network 765, and integrated audio interface 780. The data storage unit 775 may be any desired type of data storage unit, including hard drives, optical drives, solid state drives, etc. with either fixed or removable media that may store data such as the event repository 111 or instructions 777 that when executed cause the processor 710 to perform the functionality described herein.

A trusted program module (TPM) 790 may be coupled to the PCH 750 or elsewhere in the programmable device 700 for providing the TEE 106.

The following examples pertain to further embodiments.

Example 1 is a machine-readable medium, on which are stored instructions, comprising instructions that when executed cause a machine to: create an endpoint behavioral profile and an endpoint ontology model for a plurality of endpoints; transmit the endpoint behavioral profile and endpoint ontology model to an endpoint of the plurality of endpoints; receive security event data from the endpoint; and update the endpoint ontology model based on the received security event data.

In Example 2, the subject matter of Example 1 can optionally include wherein the instructions that when executed cause the machine to transmit the endpoint behavioral profile and endpoint ontology model to the plurality of endpoints comprise instructions that when executed cause the machine to transmit the endpoint behavioral profile and endpoint ontology model to a trusted execution environment within the plurality of endpoints.

In Example 3, the subject matter of Examples 1-2 can optionally include wherein the endpoint behavioral profile comprises one or more of setup parameters, configurations, and expected behaviors.

In Example 4, the subject matter of Examples 1-2 can optionally include wherein the security event data corresponds to a dynamically obtained event or a statically-extracted feature.

In Example 5, the subject matter of Example 4 can optionally include wherein the dynamically obtained event is a call to an operating system of the endpoint.

In Example 6, the subject matter of Example 4 can optionally include wherein the statically-extracted feature is an indication that a call to an operating system of the endpoint was found in a decompiled application.

In Example 7, the subject matter of Examples 1-2 can optionally include wherein the endpoint ontology model comprises one or more of identities, relationship graphs, and activities.

In Example 8, the subject matter of Examples 1-2 can optionally include wherein the endpoint ontology model comprises an ontology of a compromised endpoint.

In Example 9, the subject matter of Example 8 can optionally include wherein the security event data indicates a correlation of a behavior of the endpoint behavior with the ontology of a compromised endpoint.

Example 10 is a machine-readable medium, on which are stored instructions, comprising instructions that when executed cause an endpoint to: receive and store an endpoint behavioral profile and an endpoint ontology model from a server; generate security events based on deviation of the endpoint from the behavioral profile; and store the security events in an event repository.

In Example 11, the subject matter of Example 10 can optionally include wherein the endpoint behavioral profile and endpoint ontology model are stored in a trusted execution environment of the endpoint.

In Example 12, the subject matter of Examples 10-11 can optionally include wherein the endpoint behavioral profile comprises one or more of setup parameters, configurations, or expected behaviors.

In Example 13, the subject matter of Examples 10-11 can optionally include wherein the endpoint ontology model comprises an ontology of a compromised endpoint.

In Example 14, the subject matter of Example 13 can optionally include wherein the instructions further comprise instructions that when executed cause the endpoint to correlate the endpoint behavior with the ontology of a compromised endpoint.

In Example 15, the subject matter of Example 14 can optionally include wherein the correlation is based on a hidden Markov model.

Example 16 is a system for detecting threats in a computer network, the system comprising: a programmable control unit; a storage for storing a endpoint behavioral profile and a endpoint ontology model; and a memory, coupled to the programmable control unit, on which are stored instructions that when executed cause the programmable control unit to: receive the endpoint behavioral profile and the endpoint ontology model; extract and store events indicating a deviation of the endpoint from the endpoint behavioral profile, and detect suspicious behavior patterns based on the extracted events.

In Example 17, the subject matter of Example 16 can optionally include wherein the endpoint behavioral profile comprises one or more of setup parameters, configurations, or expected behaviors.

In Example 18, the subject matter of Examples 16-17 can optionally include wherein the storage for storing the endpoint behavioral profile and the endpoint ontology model is within a trusted execution environment.

In Example 19, the subject matter of Examples 16-17 can optionally include wherein the instructions that when executed cause the programmable control unit to detect suspicious behavior patterns comprise instructions that when executed cause the programmable control unit to correlate the extracted events with the endpoint ontology model.

In Example 20, the subject matter of Example 19 can optionally include wherein the instructions that when executed cause the programmable control unit to detect suspicious behavior patterns comprise instructions that when executed cause the programmable control unit to correlate the extracted events with the endpoint ontology model.

In Example 21, the subject matter of Example 20 can optionally include wherein the instructions that when executed cause the endpoint to correlate the extracted events with the endpoint ontology model comprise instructions that when executed cause the endpoint to use employ a hidden Markov model.

Example 22 is a method of detecting threats in a computer network, comprising: receiving by an endpoint programmable device an endpoint behavior profile and an endpoint ontology model; storing the endpoint behavior profile and the endpoint ontology model in a trusted execution environment of the endpoint; detecting events indicating a deviation of the endpoint from the endpoint behavioral profile; storing the detected events in an events repository; correlating the detected events with the endpoint ontology model; and generating a security alert responsive to a correlation that meets a predetermined threshold.

In Example 23, the subject matter of Example 22 can optionally include wherein the endpoint ontology model comprises an endpoint ontology model of a compromised endpoint.

In Example 24, the subject matter of Examples 22-23 can optionally include wherein correlating comprises applying a hidden Markov model.

Example 25 is an apparatus comprising means to perform a method as claimed in any of Examples 22-24.

Example 26 is a server apparatus can optionally include comprising: logic to create an endpoint behavioral profile and an endpoint ontology model for a plurality of endpoints; logic to transmit the endpoint behavioral profile and endpoint ontology model to an endpoint of the plurality of endpoints; logic to receive security event data from the endpoint; and logic to update the endpoint ontology model based on the received security event data.

In Example 27, the subject matter of Example 26 can optionally include logic to transmit the endpoint behavioral profile and endpoint ontology model to the plurality of endpoints comprises logic to transmit the endpoint behavioral profile and endpoint ontology model to a trusted execution environment within the plurality of endpoints.

In Example 28, the subject matter of Examples 26-27 can optionally include wherein the endpoint behavioral profile comprises one or more of setup parameters, configurations, and expected behaviors.

In Example 29, the subject matter of Examples 26-27 can optionally include wherein the security event data corresponds to a dynamically obtained event or a statically-extracted feature.

In Example 30, the subject matter of Example 29 can optionally include wherein the dynamically obtained event is a call to an operating system of the endpoint.

In Example 31, the subject matter of Example 29 can optionally include wherein the statically-extracted feature is an indication that a call to an operating system of the endpoint was found in a decompiled application.

In Example 32, the subject matter of Examples 26-27 can optionally include wherein the endpoint ontology model comprises one or more of identities, relationship graphs, and activities.

In Example 33, the subject matter of Examples 26-27 can optionally include wherein the endpoint ontology model comprises an ontology of a compromised endpoint.

In Example 34, the subject matter of Example 33 can optionally include wherein the security event data indicates a correlation of a behavior of the endpoint behavior with the ontology of a compromised endpoint.

Example 35 is an endpoint apparatus, comprising: receive and store an endpoint behavioral profile and an endpoint ontology model from a server; generate security events based on deviation of the endpoint from the behavioral profile; and store the security events in an event repository.

In Example 36, the subject matter of Example 35 can optionally include wherein the endpoint behavioral profile and endpoint ontology model are stored in a trusted execution environment of the endpoint.

In Example 37, the subject matter of Examples 35-36 can optionally include wherein the endpoint behavioral profile comprises one or more of setup parameters, configurations, or expected behaviors.

In Example 38, the subject matter of Examples 35-36 can optionally include wherein the endpoint ontology model comprises an ontology of a compromised endpoint.

In Example 39, the subject matter of Example 38 can optionally include further comprising logic to correlate the endpoint behavior with the ontology of a compromised endpoint.

In Example 40, the subject matter of Example 39 can optionally include wherein the correlation is based on a hidden Markov model.

The above description and examples are intended to be illustrative, and not restrictive. For example, the above-described embodiments may be used in combination with each other. Many other embodiments will be apparent to those of skill in the art upon reviewing the above description.

We claim:

1. A storage disk or storage device comprising instructions that, when executed, cause one or more servers to:
   create executable instructions associated with endpoint rules and an endpoint ontology model, the endpoint rules to extract events from process behaviors of a plurality of endpoints, the executable instructions to cause a first endpoint to:
      generate a first event sequence by arranging first events extracted from first process behaviors performed by the first endpoint into the first event sequence, the first events extracted based on the endpoint rules, at least one of the first events corresponding to a call to an operating system;
      generate a third event sequence to determine a correlation fit by attempting to correlate the first event sequence to stored second event sequences of the endpoint ontology model by applying a hidden Markov model to the first event sequence and the second event sequences of the endpoint ontology model, the second event sequences corresponding to known attack patterns, the third event sequence including second events, one or more of the second events being different from one or more of the first events; and
      generate a first security alert when the correlation fit satisfies a threshold;
   update the endpoint ontology model based on security event data associated with security alerts associated with respective ones of the plurality of endpoints, the security alerts including the first security alert; and
   transmit the updated endpoint ontology model to the plurality of endpoints to identify a future attack at one or more of the plurality of endpoints.

2. The storage disk or storage device of claim 1, wherein the instructions, when executed, cause the one or more servers to transmit the updated endpoint ontology model to trusted execution environments within respective ones of the plurality of endpoints.

3. The storage disk or storage device of claim 1, wherein the executable instructions are associated with an endpoint behavioral profile including at least one of one or more setup parameters, one or more configurations, or one or more expected behaviors associated with the first endpoint.

4. The storage disk or storage device of claim 1, wherein the security event data corresponds to a dynamically obtained event or a statically-extracted feature.

5. The storage disk or storage device of claim 4, wherein the dynamically obtained event is the call to the operating system.

6. The storage disk or storage device of claim 4, wherein the statically-extracted feature is an indication that the call to the operating system was found in a decompiled application.

7. The storage disk or storage device of claim 1, wherein the endpoint ontology model includes at least one of an identity, a relationship graph, or an activity.

8. The storage disk or storage device of claim 1, wherein the endpoint ontology model includes an ontology of a compromised endpoint.

9. The storage disk or storage device of claim 8, wherein the security event data indicates a correlation of a behavior of the first endpoint with the ontology of the compromised endpoint.

10. A storage disk or storage device comprising instructions that, when executed, cause an endpoint to at least:
   extract first events from process behaviors performed by the endpoint using endpoint rules from one or more servers, at least one of the first events corresponding to a call to an operating system of the endpoint;
   generate a first event sequence by arranging two or more of the first events into the first event sequence;
   generate a third event sequence to determine a correlation fit by attempting to correlate the first event sequence to stored second event sequences of an endpoint ontology model from the one or more servers by applying a hidden Markov model to the first event sequence and the second event sequences of the endpoint ontology model, the second event sequences corresponding to known attack patterns, the third event sequence including second events, one or more of the second events being different from one or more of the first events;
   generate a security alert when the correlation fit satisfies a threshold; and
   transmit security event data associated with the security alert to the one or more servers to facilitate an update of the endpoint ontology model to identify a future attack.

11. The storage disk or storage device of claim 10, wherein the endpoint rules and the endpoint ontology model are stored in a trusted execution environment of the endpoint.

12. The storage disk or storage device of claim 10, wherein the instructions, when executed, cause the endpoint to compare the process behaviors to an endpoint behavioral profile, the endpoint behavioral profile to include at least one of: one or more setup parameters, one or more configurations, or one or more expected behaviors.

13. The storage disk or storage device of claim 10, wherein the endpoint ontology model includes an ontology of a compromised endpoint.

14. The storage disk or storage device of claim 13, wherein the instructions cause the endpoint to determine the correlation fit by attempting to correlate the process behaviors of the endpoint with the ontology of the compromised endpoint.

15. An endpoint for detecting threats in a computer network, the endpoint comprising:
   one or more processors; and
   memory including instructions that, when executed, cause the one or more processors to:
      extract first events from process behaviors performed by the endpoint using endpoint rules from one or more servers, at least one of the first events corresponding to a call to an operating system of the endpoint;
      generate a first event sequence by arranging two or more of the first events into the first event sequence;
      generate a third event sequence to determine a correlation fit by attempting to correlate the first event sequence to stored second event sequences of an endpoint ontology model from the one or more servers by applying a hidden Markov model to the first event sequence and the second event sequences of the endpoint ontology model, the second event sequences corresponding to known attack patterns, the third event sequence including second events, one or more of the second events being different from one or more of the first events;
      generate a security alert when the correlation fit satisfies a threshold; and
      transmit security event data associated with the security alert to the one or more servers to facilitate an update of the endpoint ontology model to detect suspicious behavior patterns at one or more of a plurality of endpoints including the endpoint.

16. The endpoint of claim 15, wherein the instructions, when executed, cause the endpoint to compare the process behaviors to an endpoint behavioral profile, the endpoint behavioral profile to include at least one of: one or more setup parameters, one or more configurations, or one or more expected behaviors.

17. The endpoint of claim 15, wherein the endpoint rules and the endpoint ontology model are accessible within a trusted execution environment.

18. The endpoint of claim 15, wherein the endpoint ontology model is of a compromised endpoint.

19. A method of detecting threats in a computer network, the method comprising:
   extracting first events from process behaviors performed by an endpoint using endpoint rules from one or more servers, at least one of the first events corresponding to a call to an operating system of the endpoint;
   generating a first event sequence by arranging ones of the first events into the first event sequence;
   generating a third event sequence to determine a correlation fit by attempting to correlate the first event sequence to stored second event sequences of an endpoint ontology model from the one or more servers by applying a hidden Markov model to the first event sequence and the second event sequences of the endpoint ontology model, the second event sequences corresponding to known attack patterns, the third event sequence including second events, one or more of the second events being different from one or more of the first events; and
   when the correlation fit satisfies a threshold, transmitting security event data to the one or more servers to facilitate an update of the endpoint ontology model to identify a future attack at one or more of a plurality of endpoints including the endpoint.

20. The method of claim 19, wherein the endpoint ontology model is of a compromised endpoint.

* * * * *